Oct. 12, 1926.
W. GEARY
1,603,042
ADJUSTABLE SEAT STRUCTURE
Filed May 6, 1926  2 Sheets-Sheet 1
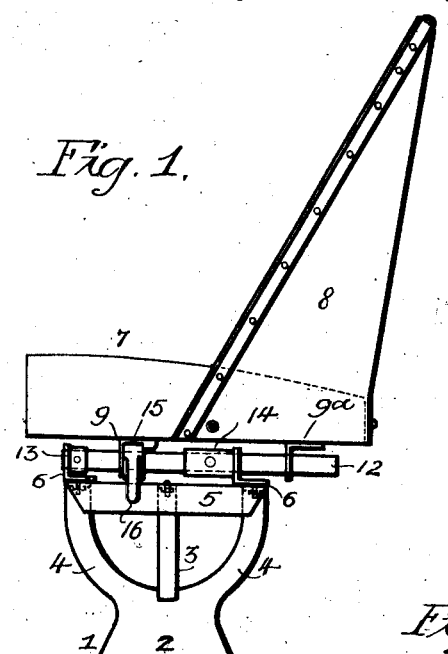
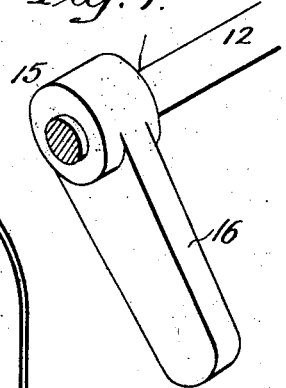
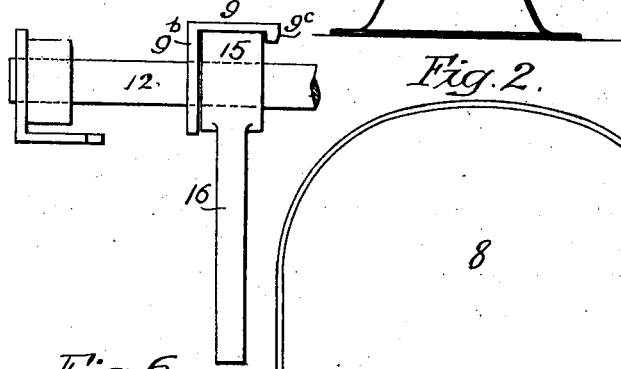
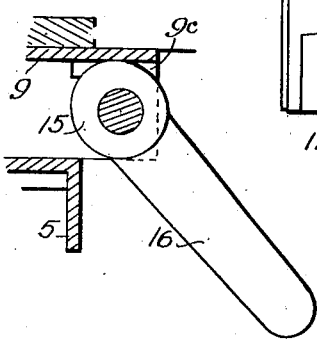
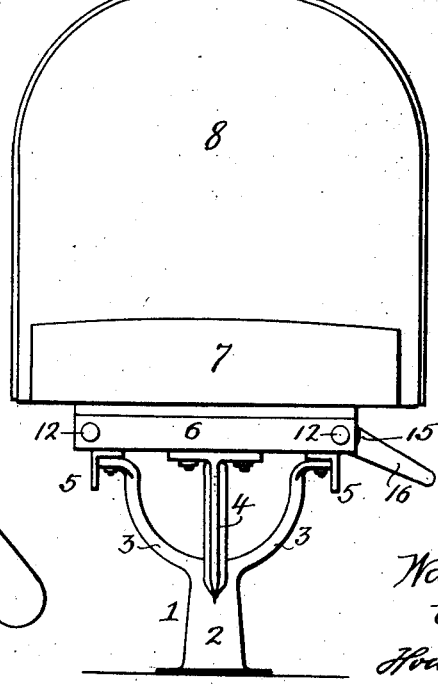
Inventor:
Warren Geary
by his Attorneys
Howson & Howson Oct. 12, 1926. 1,603,042
W. GEARY
ADJUSTABLE SEAT STRUCTURE
Filed May 6, 1926 2 Sheets-Sheet 2

Inventor:
Warren Geary
by his Attorneys
Howson & Howson

Patented Oct. 12, 1926.

1,603,042

UNITED STATES PATENT OFFICE.

WARREN GEARY, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

ADJUSTABLE-SEAT STRUCTURE.

Application filed May 6, 1926. Serial No. 107,222.

One object of my invention is to make a seat structure particularly adapted as a driver's seat for motor omnibuses and the like, in which the seat section can be adjusted longitudinally on the base.

A further object of the invention is to so design the seat structure that the seat section can be adjusted and locked while a person is occupying the seat.

In the accompanying drawings:

Fig. 1 is a side view of my improved seat structure;

Fig. 2 is a front view;

Fig. 5 is an enlarged side view showing the locking cam;

Fig. 6 is a section of part of the seat structure on the same line as Fig. 4, showing the cam in the locking position; and Fig. 7 is a detached perspective view of the cam and its bar.

Figure 3:
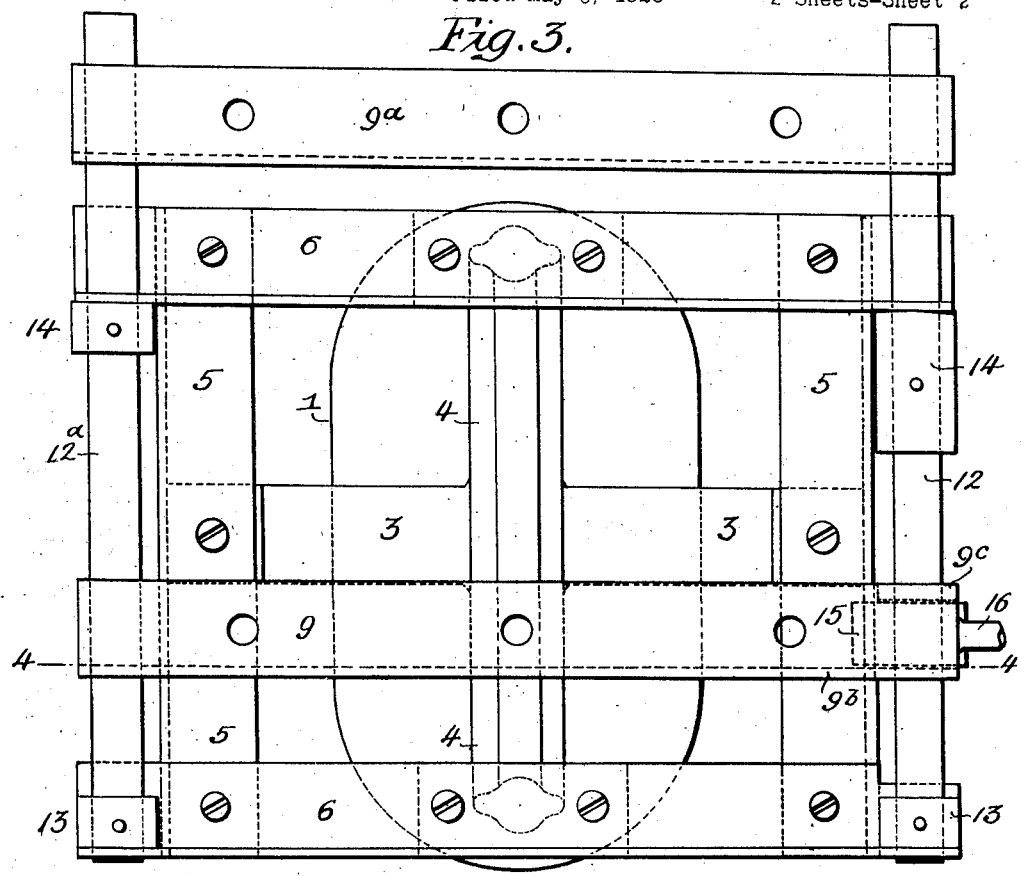
Fig. 3 is an enlarged plan view with the seat cushion and back removed.

The base 1 of the seat structure may be of any suitable design. In the present instance, the base has a flanged pedestal 2. Formed integrally with the pedestal are two lateral arms 3—3, and two longitudinal arms 4—4.

The arms 3—3 are secured to the angle irons 5—5, which connect the two transverse angle irons 6—6, forming a substantial upper structure of the base.

The seat section consists of a cushion 7 of any standard type, which in the present instance is provided with a back 8 and angle iron plates 9—9ᵃ which are firmly secured to the underside of the cushion section.

The cushion section has a frame 10 in which the cross-bars 11 form parts. The angle iron plates 9—9ᵃ are secured to these bars 11 by bolts or other fastenings.

At each side of the seat structure are round bars 12—12ᵃ, which have their bearings in the upright portions of the angle irons 6—6, and are held from moving in these bars by collars 13 and 14, Fig. 3.

The bars pass freely through openings in the angle plates 9—9ᵃ. By this construction the seat section can be moved longitudinally on the base section, so that the driver or motorman can place himself in proper position in respect to the driving and steering mechanism.

In order to lock the seat section to the base after adjustment, a cam 15 is provided, which is loosely mounted on the bar 12 directly under the plate 9, in the present instance, and between the flange 9ᵇ and a lug 9ᶜ on the plate, so that when the seat section is moved longitudinally on the bars, the cam travels with the seat section.

Figure 4:
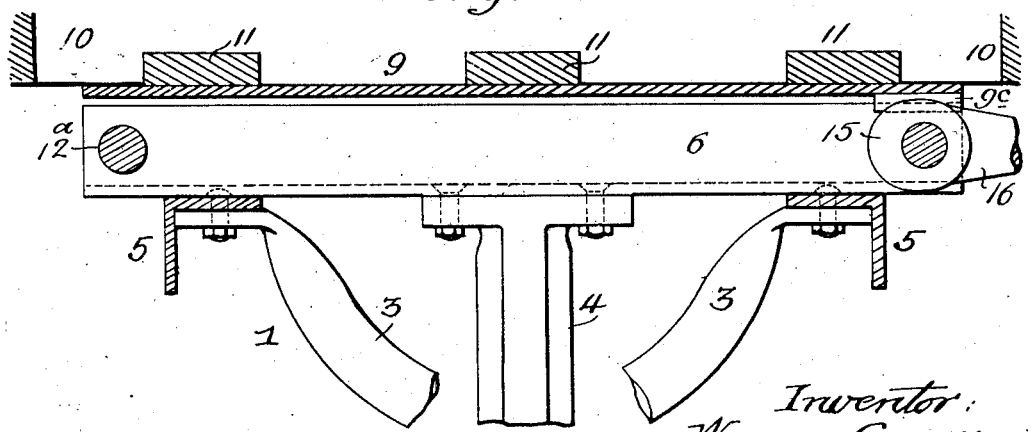
Fig. 4 is a sectional view on the line 4—4, Fig. 3.

On the cam is an arm 16 by which the cam can be moved to a clamping position as in Figs. 5 and 6, in which the cam bears against the plate 9, or moved to a position free of the plate as in Fig. 4.

When in the latter position the seat section is free to be moved and can be moved while occupied, and after the seat is adjusted the occupant can lock the seat section to the base section by bearing down upon the arm 16 of the cam 15.

This seat structure is substantial and simple in construction, and the seat section can be readily adjusted in respect to the base section and locked in the position in which it is adjusted.

While the seat structure is particularly adapted as a driver's seat for motor omnibuses, it will be understood that it can be used when an adjustable seat is desired, and it can be arranged so that the seat section can be adjusted transversely instead of longitudinally if desired.

I claim:—

1. The combination in a seat structure, of a base section having transverse angle irons; a seat structure mounted on the base and having transverse angle plates thereon; a bar at each side of the structure having their bearings in the angle irons of the base and extending through the angle plates freely so that the seat section can be moved on the base section; and a cam loosely mounted on one of said bars and arranged to be forced into locking contact with the seat section.

2. The combination in a seat structure, of a base having two transverse angle irons; angle irons connecting said transverse irons and forming the upper structure of the base; a rod at each side of said structure and having their bearings in the transverse angle irons; collars on the rods preventing them moving longitudinally in their bearing; a seat section having transverse angle plates through which the bars extend; a cam loose on one of said bars and arranged to be forced against one of the plates of the seat section, said cam being located between a flange on the plate and a lug thereon so as to move longitudinally with the seat section, said cam having an arm by which it is manipulated.

WARREN GEARY.